US008385451B2

(12) United States Patent
Olesen et al.

(10) Patent No.: US 8,385,451 B2
(45) Date of Patent: Feb. 26, 2013

(54) METHOD AND APPARATUS FOR IMPROVED SPATIAL TEMPORAL TURBO CHANNEL CODING (STTCC) USING EIGEN-BEAMFORMING

(75) Inventors: Robert Lind Olesen, Huntington, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1141 days.

(21) Appl. No.: 11/760,266

(22) Filed: Jun. 8, 2007

(65) Prior Publication Data

US 2007/0291868 A1    Dec. 20, 2007

Related U.S. Application Data

(60) Provisional application No. 60/811,972, filed on Jun. 8, 2006.

(51) Int. Cl.
*H04B 7/02*      (2006.01)
*H04L 25/49*     (2006.01)

(52) U.S. Cl. ........................................ 375/267; 375/296

(58) Field of Classification Search ................... 375/260, 375/267, 296
See application file for complete search history.

(56) References Cited

U.S. PATENT DOCUMENTS

| | | | |
|---|---|---|---|
| 2003/0128769 A1* | 7/2003 | Kim et al. | 375/265 |
| 2004/0185909 A1* | 9/2004 | Alexiou et al. | 455/562.1 |
| 2004/0208145 A1* | 10/2004 | Sim et al. | 370/335 |
| 2005/0276344 A1* | 12/2005 | Ling et al. | 375/260 |
| 2006/0056534 A1* | 3/2006 | Ionescu et al. | 375/267 |
| 2006/0068718 A1* | 3/2006 | Li et al. | 455/69 |
| 2006/0187876 A1* | 8/2006 | Schmidl et al. | 370/328 |

OTHER PUBLICATIONS

Sampath et al. "Generalized Linear Precoder and Decoder Design for MIMO Channels using the Weighted MMSE Criterion." Dec. 2011, IEEE Transactions on Communications, vol. 49, No. 12, pp. 2200, 2201.*
Hammerschmidt et al., *Eigenbeamforming—A Novel Concept in Array Signal Processing*, Retrieved from file:///C:/Documents%20and%20Settings/CDuncan/Local%20Settings/Temporary%20Internet%20Files/OLKA2olar.htm, Last Visited on (Nov. 12, 2007).
Pan et al., *MIMO Schemes for Single Carrier Frequency Division Multiple Access Systems*, Submitted to Globecomm (2006).
Philips, *Coded MIMO-OFDM Schemes for E-UTRA*, 3GPP TSG RAN WG1 Meeting #43, R1-051468, (Seoul, Korea Nov. 7-11, 2005).
Philips, *Text Proposal for Spatial Temporal Turbo Channel Coding*, 3GPP TSG RAN WG1 Meeting #42, R1-050723, (London, UK Aug. 29-Sep. 2, 2005).

* cited by examiner

*Primary Examiner* — Shuwang Liu
*Assistant Examiner* — David Huang
(74) *Attorney, Agent, or Firm* — Volpe and Koenig, P.C.

(57) ABSTRACT

The present invention is a method and apparatus for improving the performance of spatial temporal turbo channel coding (STTCC) used in multiple-input multiple-output (MIMO) wireless communication systems called eigen-STTCC (E-STTCC) that employs eigen-beamforming to make use of orthogonal eigen streams in the MIMO channel. Singular value decomposition (SVD) is applied to the channel matrix producing a linear precoding matrix containing the orthonormal basis for the eigen streams. In a first embodiment, the turbo encoded codeword containing concatenated systematic and parity bits is precoded with the linear precoding matrix such that the systematic bits are transmitted over the eigen streams with highest power. In a second embodiment, the codeword is made up of interleaved systematic bits and parity bits prior to eigen beamform preceding, effectively interleaving the systematic and data bits spatially over the eigen streams. In an alternate embodiment, the data stream is interleaved at the input to the encoder.

10 Claims, 6 Drawing Sheets

METHOD AND APPARATUS FOR IMPROVED SPATIAL TEMPORAL TURBO CHANNEL CODING (STTCC) USING EIGEN-BEAMFORMING

CROSS REFERENCE TO RELATED APPLICATIONS

This application claims priority from U.S. Provisional Patent Application No. 60/811,972 filed on Jun. 8, 2006 which is incorporated by reference as if fully set forth.

FIELD OF INVENTION

The present invention is generally related to wireless communication systems. More specifically, the present invention is a method and apparatus for improving spatial temporal turbo channel coding (STTCC) by leveraging the spatial degrees of freedom in a multiple-input multiple output (MIMO) channel provided by eigen-beamforming.

BACKGROUND

In the operation of a wireless communication system, a transmitter device transmits a signal containing useful data to a receiver device over an air interface. In multiple-input multiple-output (MIMO) wireless communication systems, a signal is transmitted over multiple parallel paths by way of multiple transmit antennas and/or multiple receive antennas. A MIMO system takes advantage of the spatial diversity and/or multiplexing provided by multiple parallel antennas to improve the signal-to-noise ratio (SNR) of the combined received signal and increase data throughput without increasing bandwidth usage. MIMO has many benefits including improved spectrum efficiency, improved bit rate and robustness at the cell edge, reduced inter-cell and intra-cell interference, improvement in system capacity and reduced average transmit power requirements.

Error correcting codes are commonly used in wireless systems to protect against bit errors in received signals caused by channel fading, interference and receiver defects. Typically, an encoder adds redundancy information to user data prior to transmission, and a corresponding decoder is applied to the received signal to recover the original data. Turbo codes are a particular type of high-performance error correcting code. FIG. 1 shows an example of a spatial temporal turbo channel coding (STTCC) encoder 100 designed to exploit the correlation between spatial paths corresponding to different transmit antennas in a MIMO wireless communication system. STTCC encoder 100 also uses time diversity by transmitting the same symbols repeatedly over time, as described below. Because STTCC encoder 100 exploits both time and space diversity, it can be described as a space-time frequency modulation encoder.

Referring to FIG. 1, given a desired data rate of L bits/symbol period, a vector $B=[b_1, \ldots b_L]$ of L data bits is derived from the high-speed data stream X using serial-to-parallel (S/P) converter 105. The data vector $B=[b_1, \ldots b_L]$ is processed according to 3 parallel paths to produce systematic bits comprising the useful data bits and two sets of parity bits comprising the redundant error correcting information. Each path of STTCC encoder 100 is described below.

In the first path, modulation mapping unit $114_1$ provides systematic symbols $[s_1, \ldots, s_U]$ based on the information bit vector B according to a modulation mapping function $\Phi[B]=[s_1, \ldots, s_U]$, where $\Phi[.]$ maps the data bits onto transmitted symbols based on the modulation type. For example, for quadrature phase shift keying (QPSK) modulation, a symbol comprises 2 bits and thus the corresponding number of systematic symbols is U=L/2 symbols. The systematic symbols are provided to circular shifted switcher 130.

In the second path, recursive encoder $110_1$ is used to generate a first set of encoded parity bits $D^1=[d_1^1, \ldots, d_M^1]$. A recursive encoder implies that a current output is calculated based on a current input and previous encoder outputs provided by a feedback path. An example of a recursive encoder is a recursive convolutional encoder. The encoded parity bits $D^1=[d_1^1, \ldots, d_M^1]$ are provided to a rate matching unit $112_1$ that may add or delete bits from vector $D^1$ as needed to achieve a desired data rate. These techniques are referred to as padding and puncturing, respectively. The length P of the resulting output vector $C^1=[c_1^1, \ldots, c_P^1]$ determines the coding rate of the STTCC encoder. Modulation mapping unit $114_2$ maps the vector bits $C^1=[c_1^1, \ldots, c_P^1]$ to encoded parity symbol vector $S^1=[s_{U+1}^1, \ldots, s_N^1]$ according to modulation mapping function $\Phi^1[C]=[s_{U+1}^1, \ldots, s_N^1]$, where N is the total number of transmit antennas. Examples of modulation mapping functions include, but are not limited to, QPSK modulation, 16 quadrature amplitude modulation (16-QAM), 64 quadrature amplitude modulation (64-QAM) and higher-order modulation.

A second set of encoded parity bits $D^2=[d_1^2, \ldots, d_M^2]$ are generated by first interleaving the bits of data vector $B=[b_1, \ldots b_L]$ using interleaver 107 and providing the interleaved vector $B'=[b'_1, \ldots b'_L]$ to recursive encoder $110_2$. Interleaver 107 may, for example, arrange vector B according to odd and even bits. The encoded parity bits $D^2=[d_1^2, \ldots, d_M^2]$ are provided to rate matching unit $112_2$ where vector $D^2$ is padded or punctured as required to meet the desired data rate producing vector $C^2=[c_1^2, \ldots, c_P^2]$. Modulation mapping unit $114_2$ maps vector $C^2=[c_1^2, \ldots, c_P^2]$ to encoded parity symbol vector $S^2=[s_{U+1}^2, \ldots, s_N^2]$ according to a modulation mapping function $\Phi^2[C]=[s_{U+1}^2, \ldots, s_N^2]$. The encoded symbol vector $S^2$ may be de-interleaved if desired by de-interleaver 115.

The encoded parity symbol vectors $S^1$ and $S^2$ are selectively outputted over time by multiplexer 120. For example, at each symbol period the encoded parity vector $[s_{U+1}, \ldots, s_N]$ output by multiplexer 125 may alternate between the first parity vector $[s_{U+1}, \ldots, s_N]=[s_{U+1}^1, \ldots, s_N^1]$ and the second parity vector $[s_{U+1}, \ldots, s_N]=[s_{U+1}^2, \ldots, s_N^2]$. The combined symbol vector $S=[s_1, \ldots, s_u, s_{u+1}, \ldots, s_N]$ comprising the systematic bits and the encoded parity symbols is called the codeword and has a data rate of L/L+P and a coding rate of P/L+P. Codeword S is provided to a circular shifted switcher 130 that provides the symbols of vector S cyclically over time to each of N transmit antennas for transmission, according to the following.

The output vector $S'=[s'_1, \ldots, s'_N]$ of circular shifted switcher 130 is mapped to the set of antennas 1, 2, ..., N (not shown) such that symbol $s'_1$, is transmitted by antenna 1, symbol $s'_2$ is transmitted by antenna 2 and the remaining symbols are transmitted accordingly by respective antennas up to antenna N. The circular shifted switcher 130 maps the symbols of vector S to vector $S'=[s'_1, \ldots, s'_N]$ by cyclically rotating vector S at each consecutive symbol period, so that each symbol gets mapped to a different antenna over time. For example, at symbol period $t_1 [s'_1, \ldots, s'_N]=[s_1, \ldots, s_N]$ such that symbol $s_1$ is transmitted by antenna 1, and at symbol period $t_2 [s'_1, \ldots, s'_N]=[s_N, s_1 \ldots, s_{N-1}]$ such that symbol $s_1$ is transmitted by antenna 2. The circular rotation of vector S continues accordingly for up to N symbol periods.

Following the STTCC encoder 100, and prior to transmission over the N parallel transmit antennas, the symbols

[s'$_1$, ..., s'$_N$] may undergo further processing as desired including, but not limited to, interleaving, spreading, scrambling, pulse shaping and carrier modulation (not shown).

The STTCC encoder 100 transmits the encoded symbols over different spatial streams provided by the multiple antennas, however, the prior art STTCC encoder does not take into account signal quality or signal power over possible spatial streams when assigning codeword symbols to spatial streams for transmission. The performance of the STTCC including power efficiency can be improved by effectively exploiting the additional spatial degrees of freedom in a MIMO channel afforded by the use of eigen-beamforming techniques.

SUMMARY

The present invention is a method and apparatus for improving spatial temporal turbo channel coding (STTCC) in multiple-input multiple-output (MIMO) wireless communication systems by spatially multiplexing data bits and parity bits onto orthogonal spatial streams using eigen-beamforming techniques. According to the present invention, the proposed eigen-STTCC (E-STTCC) encoder applies singular value decomposition (SVD) to a channel matrix to produce a unitary matrix comprising the orthonormal basis for orthogonal spatial streams of the channel, called the eigen streams, and a diagonal matrix comprising the singular values that are proportional to the input power of the corresponding eigen streams. The turbo encoded codeword is multiplied by the unitary matrix, called the linear preceding matrix, in order to map the codeword symbols to the eigen streams for transmission.

According to a first embodiment, data bits (systematic bits) are transmitted over the eigen streams with the highest power (and highest singular value) and parity bits are transmitted over eigen streams with lower power (and lower singular value) in order to maximize the efficiency of the power used to transmit the user data and to prioritize systematic bits taking into account the fact that systematic bits in a turbo encoded codeword are more important than parity bits.

According to a second embodiment, the systematic bits and parity bits are interleaved prior to eigen-beamforming in order to spatially interleave the systematic and parity bits over the orthogonal eigen streams. In another embodiment, interleaving is applied to the input data stream prior to E-STTCC encoding to reduce complexity and memory requirements.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

The present invention is applicable to any type of wireless communication system employing spatial diversity techniques and in particular multiple-input multiple-output (MIMO) systems. Examples of MIMO systems include, but are not limited to orthogonal frequency-division multiplexing (OFDM) or orthogonal frequency division multiple access (OFDMA) systems employing MIMO such as long term evolution (LTE) systems, high speed packet access evolution (HSPA+) systems, wireless metropolitan area networks (wirelessMANs) employing the 802.16 family of standards and wireless local area networks (wireless LANs) employing the 802.11n standard.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention provides improvements to prior art spatial temporal turbo channel coding (STTCC) schemes for MIMO systems, and is referred to as eigen-STTCC (E-STTCC). E-STTCC employs MIMO preceding, or eigen-beamforming, to selectively transmit data symbols and parity symbols over separate orthogonal spatial streams of the MIMO channel, called eigen streams, to increase data rates and reduce channel errors. The present invention is preferably (but not required to be) used in a transmitter with multiple antennas and may be used in a base station or a WTRU. Preferred embodiments of the present invention are described below.

Figure 1:
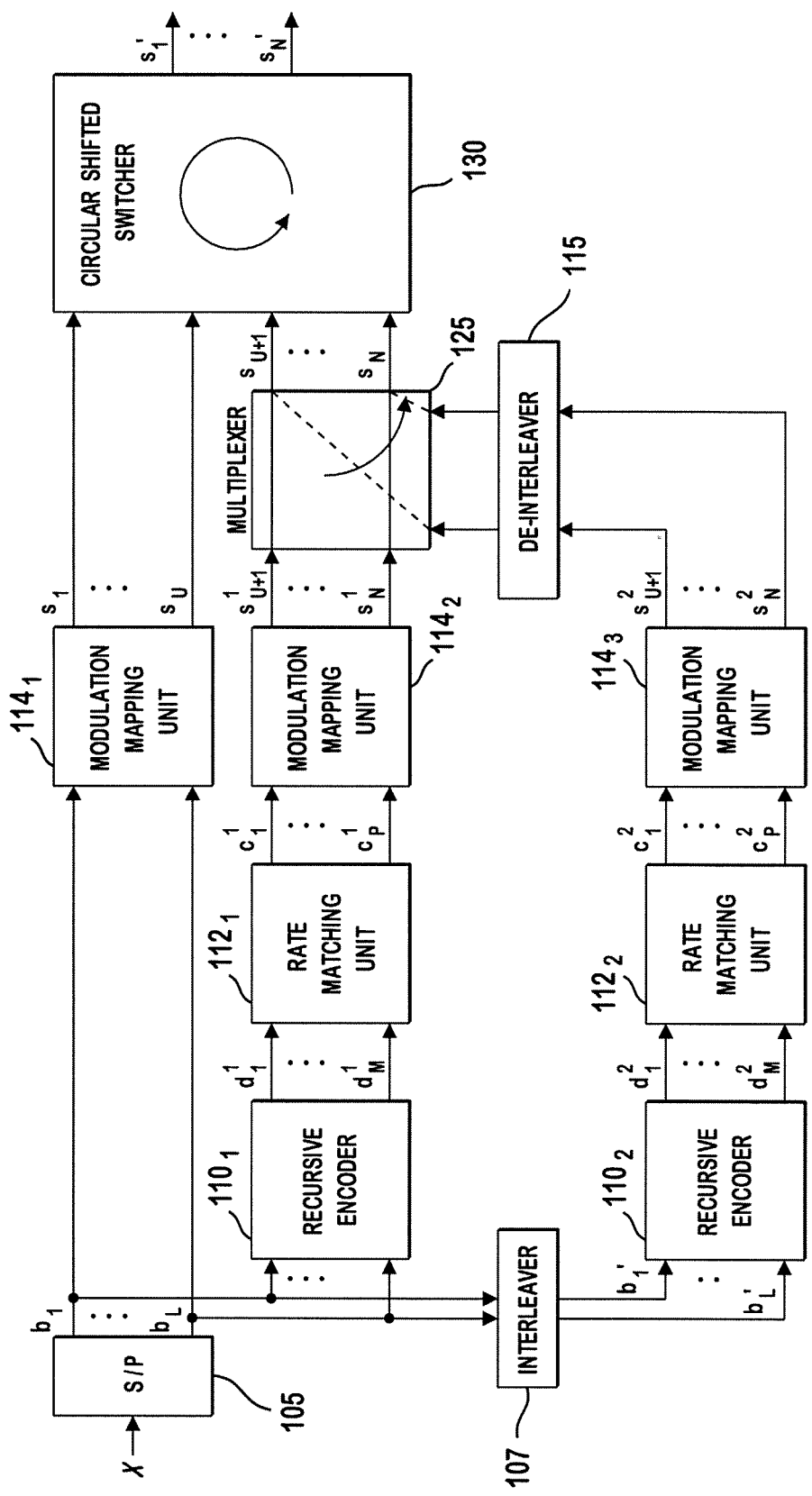
FIG. 1 shows an example of a prior art spatial temporal turbo channel coding (STTCC) encoder.
Figure 2:
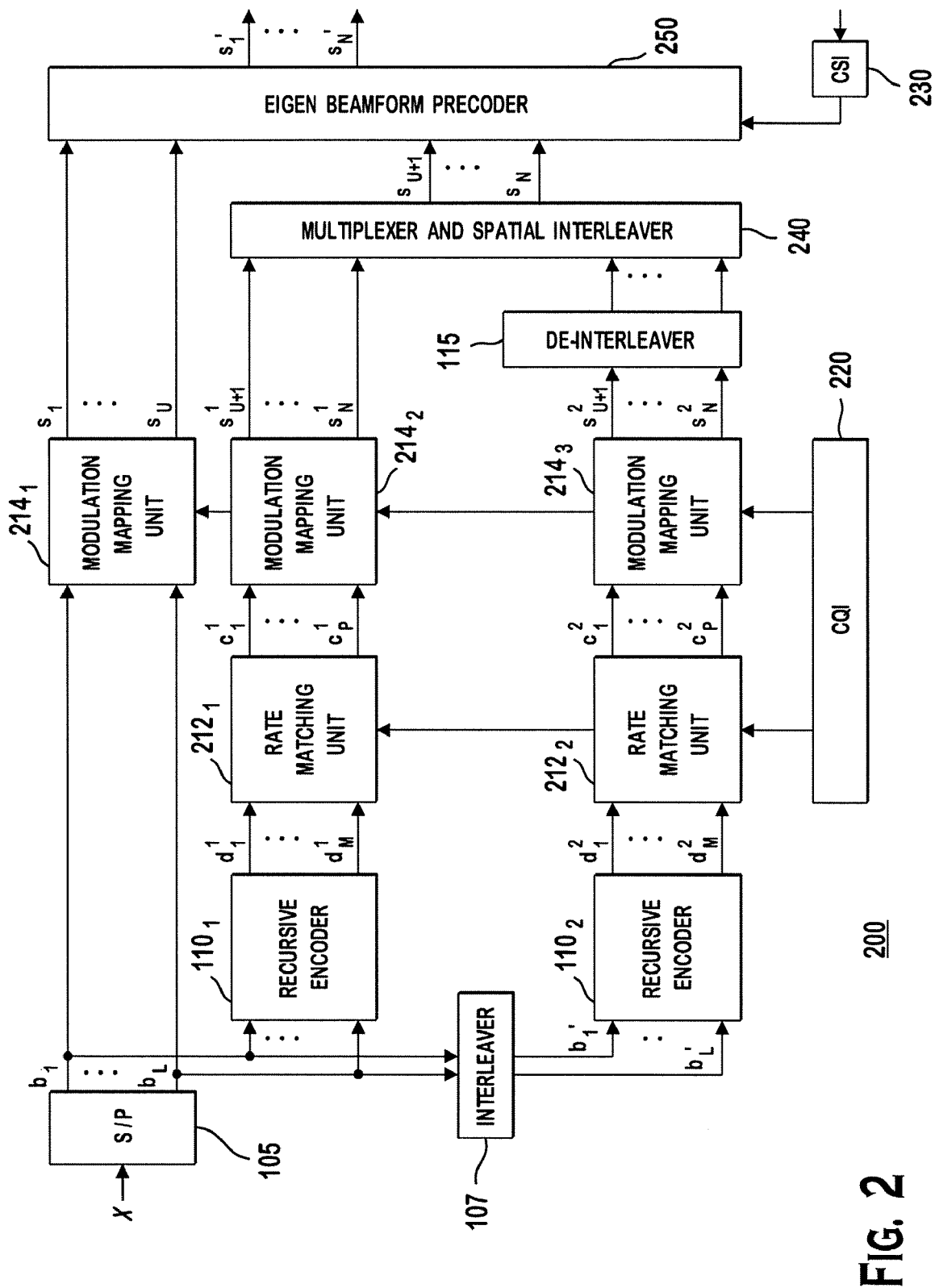
FIG. 2 shows a block diagram of an eigen-STTCC (E-STTCC) encoder that allocates the systematic bits to the eigen streams with the highest power in accordance with a first embodiment of the present invention.

FIG. 2 shows a block diagram of an E-STTCC encoder 200 that allocates the systematic bits to the eigen streams with the highest power, and correspondingly the highest eigen or singular value, in accordance with a first embodiment of the present invention. According to the present invention, channel quality information (CQI) 220 and channel state information (CSI) 230 based on channel measurements are provided to E-STTCC encoder 200. Serial-to-parallel (S/P) converter 105, interleaver 107, recursive encoders 110$_1$, 110$_2$, rate matching units 212$_1$, 212$_2$, modulation mapping units 214$_1$, 214$_2$, 214$_3$ and de-interleaver 115 operate as described in FIG. 1 to produce systematic symbols [s$_1$, ..., s$_U$], and two sets of encoded parity symbols $S^1=[s_{U+1}^1, \ldots, s_N^1]$ and $S^2=[s_{U+1}^2, \ldots, s_N^2]$. Additionally, rate matching units 212$_1$, 212$_2$ and modulation mapping units 214$_1$, 214$_2$, 214$_3$ may adapt the coding rate or the modulation scheme, respectively, according to the channel quality provided by CQI value 220, if desired. For example, if the CQI value 220 indicates a high bit error rate (BER), the rate matching units 212$_1$, 212$_2$ can apply padding to decrease the code rate and modulation mapping units 214$_1$, 214$_2$, 214$_3$ may change the modulation scheme from 16-QAM to QPSK to improve robustness of the transmitted codeword against bit errors.

The encoded parity symbols $S^1=[s_{U+1}^1, \ldots, s_N^1]$ and $S^2=[s_{U+1}^2, \ldots, s_N^2]$ are provided to multiplexer and spatial interleaver 240 where the parity symbols are selectively multiplexed. For example, the selected parity symbols may alternate between the parity symbols $S^1=[s_{U+1}^1, \ldots, s_N^1]$ and $S^2=[s_{U+1}^2, \ldots, s_N^2]$ at each symbol period. Alternatively, other multiplexing schemes may be used. The multiplexer and spatial interleaver 240 may interleave the multiplexed parity symbols in cases where the number of antennas is N>2 to produce selected parity symbol vector $[s_{u+1}, \ldots, s_N]$. The overall codeword $S=[s_1, \ldots, s_u, s_{u+1}, \ldots, s_N]$ is provided to eigen beamform precoder 250.

Eigen beamform precoder 250 maps codeword $S=[s_1, \ldots, s_N]$ to output vector $S'=[s'_1, \ldots, s'_N]$ where each signal $s'_i$ is transmitted over a corresponding antenna i. Specifically, eigen beamform precoder 250 uses eigen-beamforming to determine a linear mapping of codeword S to output vector S' such that each symbol $s_i$ of codeword S is transmitted via an orthogonal spatial stream or channel, referred to as an eigen stream. The eigen streams are spatially separate and orthogonal paths or subchannels of the MIMO channel, such that an eigen stream does not necessarily correspond to a single transmit antenna, but is likely a weighted combination of the signals transmitted by different antennas.

To determine the mapping of input vector S to output vector S', eigen beamform precoder 250 is provided with CSI 230 in the form of a channel matrix H representing the current channel state or an estimate of the channel state. Eigen beamform precoder 250 decomposes channel matrix H preferably using singular value decomposition (SVD), or an equivalent operation thereof, to produce unitary matrices U and V and diagonal matrix D $$H=UDV^H \qquad \text{Equation (1)}$$

where $V^H$ is the Hermitian of matrix V. The columns of matrix V, an N×N matrix, form the orthonormal basis for the eigen streams entering the MIMO channel, and matrix U, an M×M matrix, is the orthonormal basis for the output of the channel, where M may be, for example, the number of receive antennas or the number of subcarriers in an OFDM channel, or a combination thereof. The entries along the diagonal matrix D are the singular values or eigen values of the channel matrix H, and are the scalar weights of the orthogonal eigen streams that map the input space V to the output space U. The square of the eigen values equal the total power of each respective eigen stream.

According to a first embodiment of the present invention, it is desirable to transmit the systematic symbols $[s_1, \ldots, s_U]$ over the eigen stream or streams with the largest power and accordingly the lowest bit error rate. The rationale is that the systematic symbols in a turbo coded codeword contain the user data and are typically the most important bits for successful decoding at a receiver. Hence, in order to maximize the probability of successful receiving and decoding systematic symbols at a receiver, it is desirable to transmit the systematic symbols over the eigen stream or streams with the lowest bit error rate.

Figure 3:
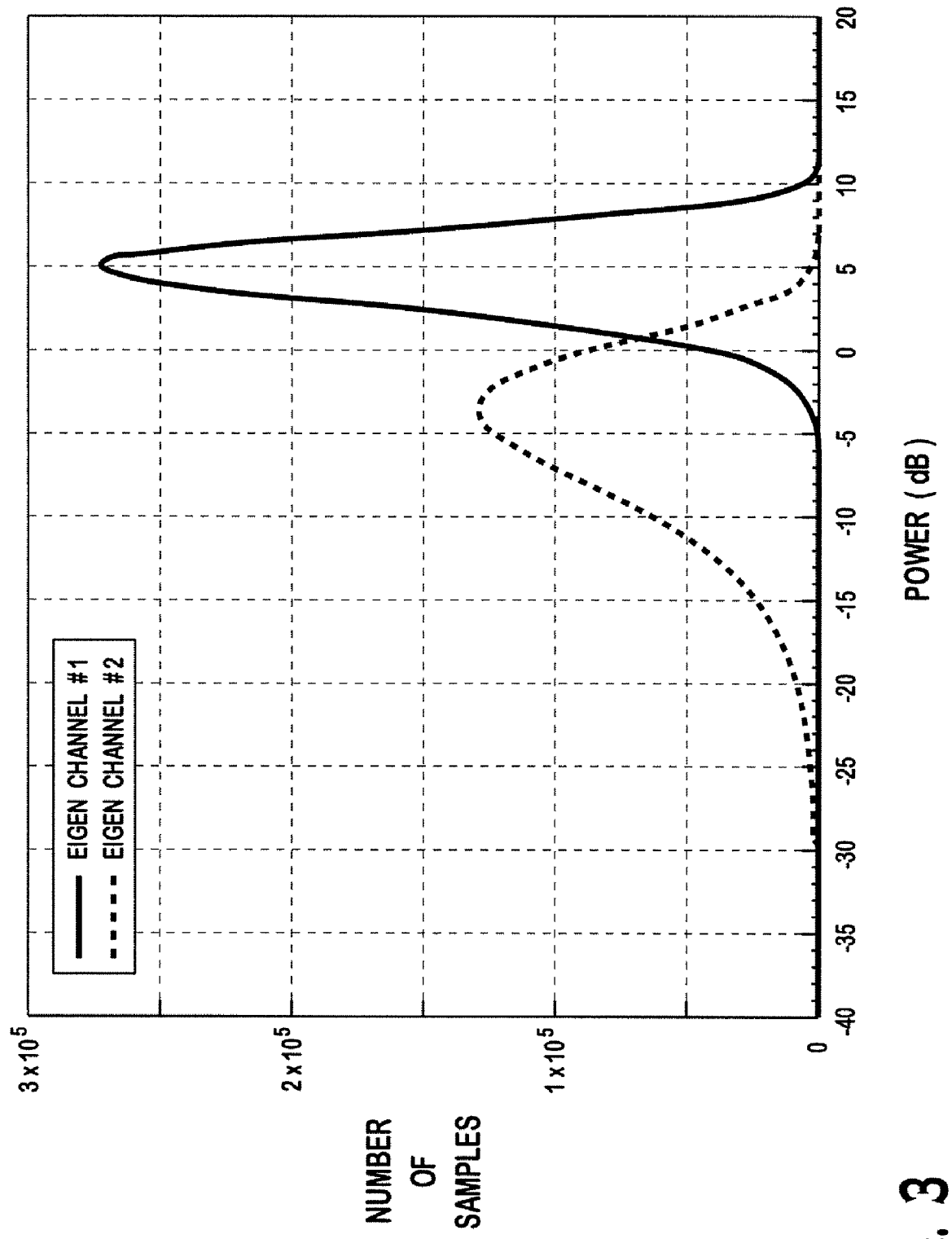
FIG. 3 shows a histogram of power levels for first and second eigen streams measured by simulation.

It is known that as a result of SVD, the eigen values in matrix D are arranged in decreasing order, and thus the eigen streams corresponding to matrices D and V are ordered according to decreasing power level that is proportional to the eigen value. FIG. 3 shows a histogram of power values of the first and second eigen streams measured by simulation of a time-varying multipath OFDM channel, where samples of the time-evolving channel matrix H were taken once every OFDM symbol. The bits of codeword $S=[s_1, \ldots, s_N]$ are spatially multiplexed onto the eigen streams by multiplying codeword S with the orthonormal basis matrix V, also called the linear precoding matrix:

$$S'=VS. \qquad \text{Equation (2)}$$

Accordingly, Equation 2 maps the systematic symbols $[s_1, \ldots, s_U]$ to the eigen streams with the highest power and maps the parity symbols $[s_{U+1}, \ldots, s_N]$ to subsequent eigen streams with lower power, thus increasing the robustness of the systematic symbols to bit errors and improving the overall performance of the turbo encoder.

Figure 4:
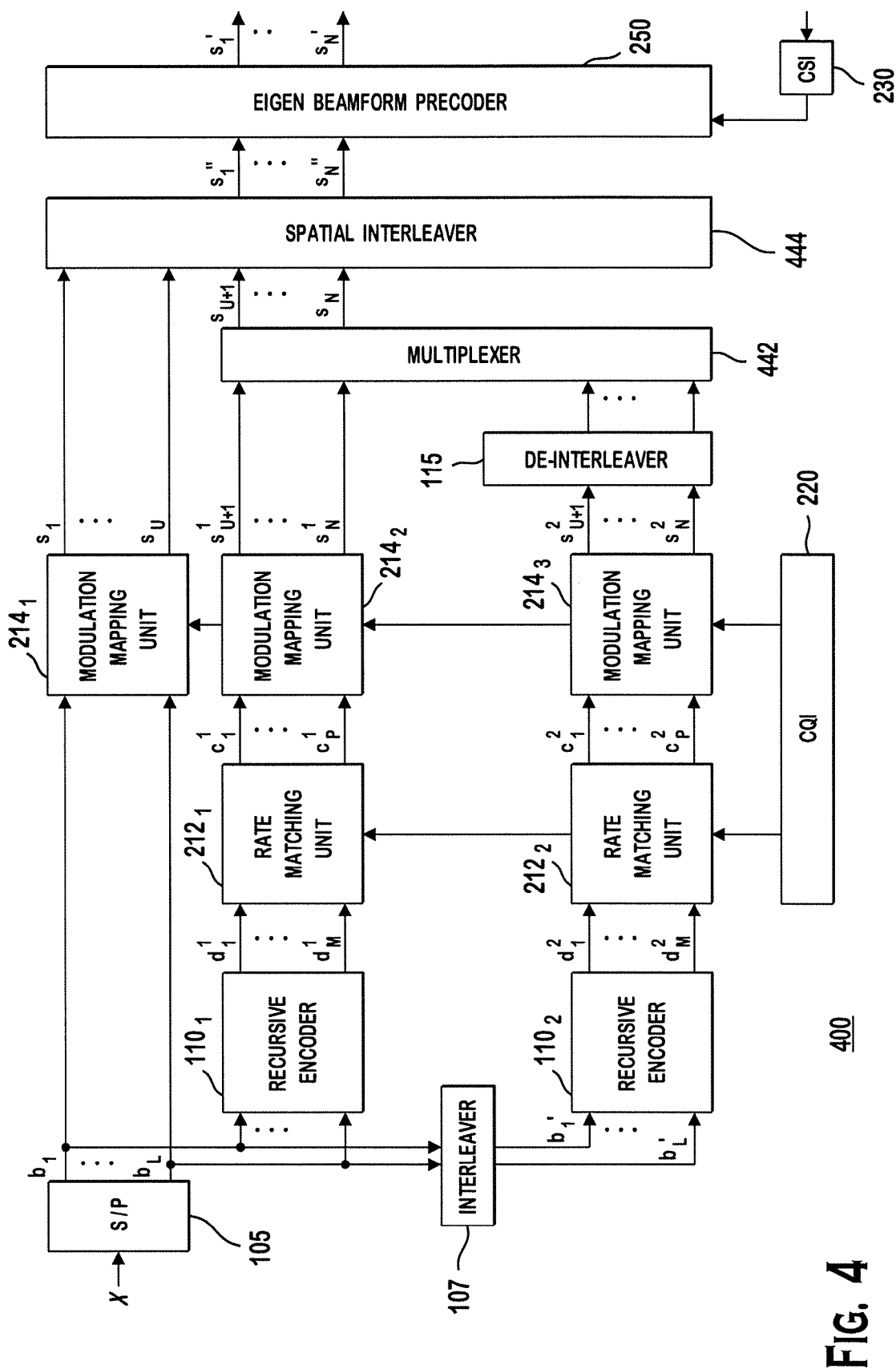
FIG. 4 is a block diagram of an E-STTCC encoder that spatially interleaves systematic bits and parity bits in accordance with a second embodiment of the present invention.

FIG. 4 illustrates of block diagram of an E-STTCC encoder 400 that spatially interleaves systematic symbols $[s_1, \ldots, s_U]$ and parity bits $[s_{u+1}, \ldots, s_N]$ in accordance with a second embodiment of the present invention. Specifically, the multiplexer and interleaver 240 of FIG. 2 is split into separate multiplexer 442 that multiplexes encoded parity symbols $S^1=[s_{U+1}^1, \ldots, s_N^1]$ and $S^2=[s_{U+1}^2, \ldots, s_N^2]$ producing parity symbol vector $[s_{U+1}, \ldots, s_N]$, and spatial interleaver 444 that interleaves the systematic symbols $[s_1, \ldots, s_U]$ and parity symbols $[s_{U+1}, \ldots, s_N]$ together producing interleaved codeword $S''=[s''_1, \ldots, s''_N]$. Eigen beamform precoder 250 maps vector S'' to vector S' according to $S'=VS''$ where V is the linear precoding matrix described above. Accordingly, by interleaving the systematic bits and parity bits prior to eigenbeamforming, the systematic bits and parity bits are spatially interleaved across the orthogonal eigen streams.

Figure 5:
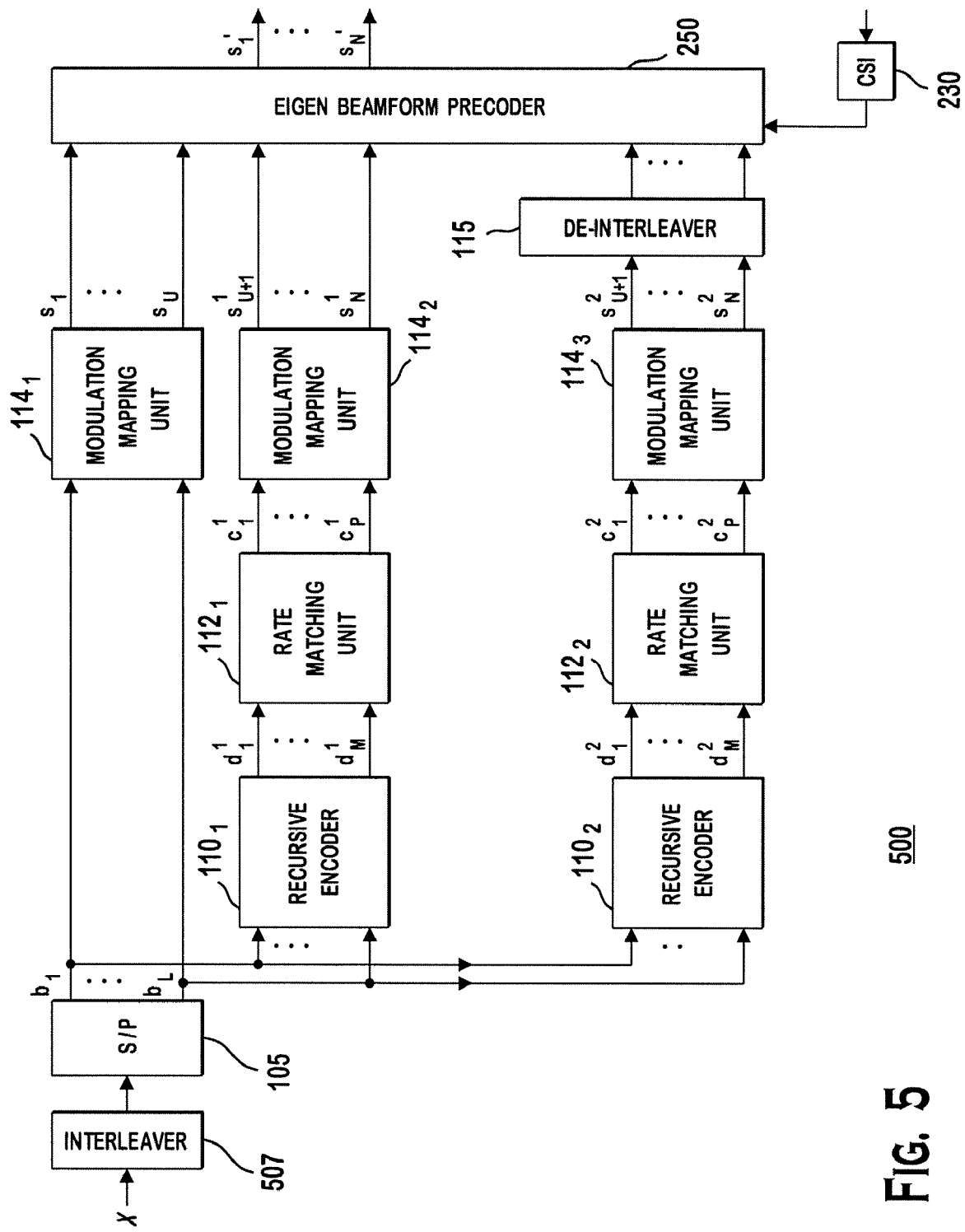
FIG. 5 is a block diagram of an E-STTCC encoder having an interleaver at the input of the encoder in accordance with an embodiment of the present invention.

In an alternate embodiment of the present invention shown in FIG. 5, interleaver 507 is placed at the input of E-STTCC encoder 500, and the interleaver is removed from the path that calculates the second set of parity bits $S^2=[s_{U+1}^2, \ldots, s_N^2]$. The interleaver in the path of the parity bits is redundant because the parity bits are transmitted over a common eigen stream and thus experience the identical channel conditions. Placing interleaver 507 at the input of E-STTCC encoder 500 reduces implementation complexity and memory requirements. A multiplexer and/or interleaver as illustrated in the embodiments in FIGS. 2 and 4 may be applied to the codeword prior to eigen beamform precoder 250, as desired.

Figure 6:
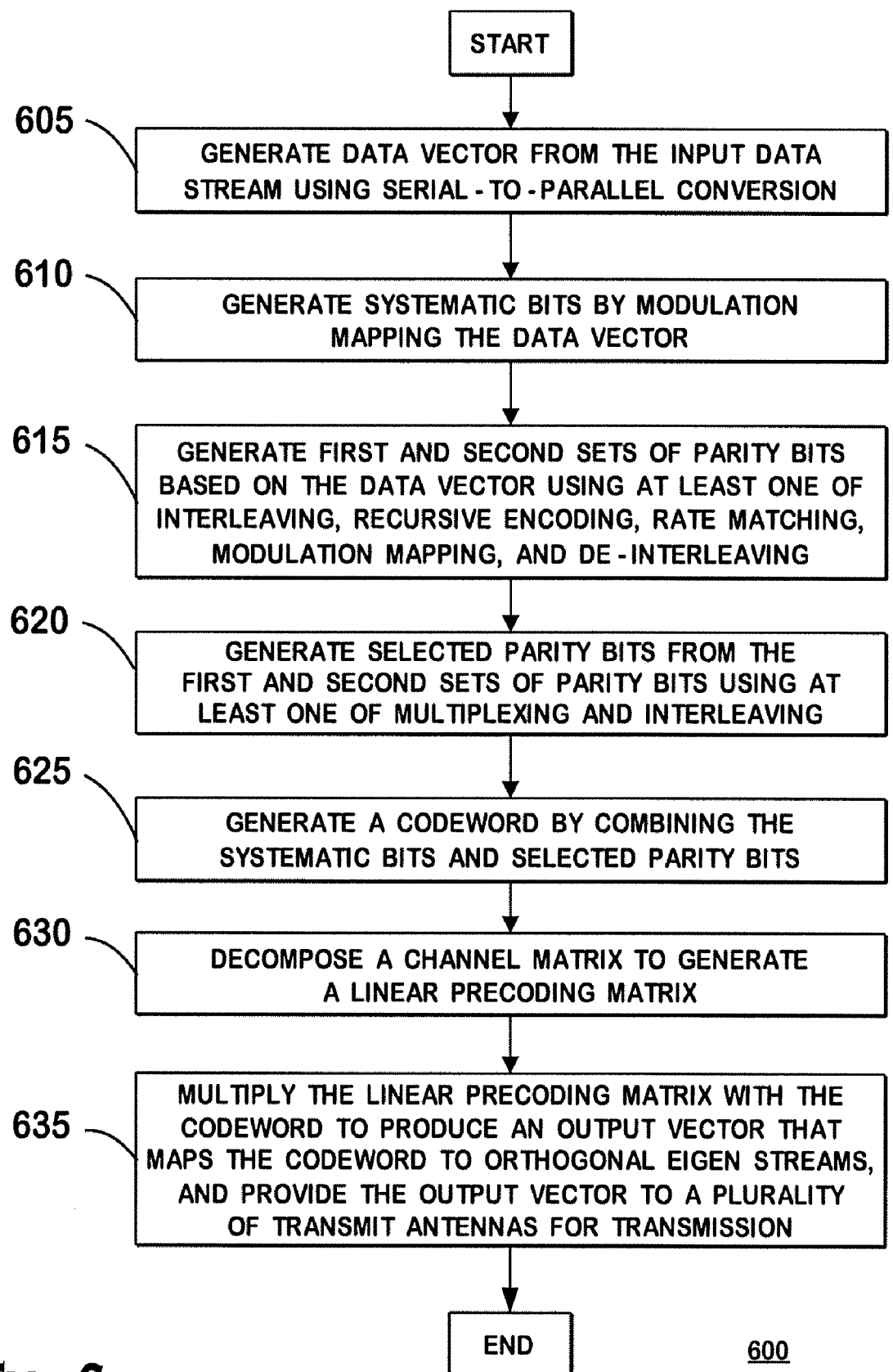
FIG. 6 is a flow diagram for E-STTCC encoding using eigen-beamforming in accordance with the present invention.

FIG. 6 is a flow diagram for E-STTCC encoding using eigen-beamforming in accordance with the present invention. In step 605, a data vector is generated from the input data stream using serial-to-parallel conversion. Systematic bits are generated by modulation mapping the data vector in step 610. In step 615, first and second sets of parity bits are generated based on the data vector preferably using interleaving, recursive encoding, rate matching, modulation mapping, and de-interleaving. In step 620, selected parity bits are generated from the first and second sets of parity bits using at least one of multiplexing and interleaving. A codeword is generated in step 625 by combining the systematic bits and selected parity bits.

Recall that in a first embodiment, the systematic bits are concatenated with the selected parity bits. In a second embodiment, the systematic bits are spatially interleaved with the selected parity bits. In step 630, a channel matrix is decomposed to generate a linear precoding matrix, preferably using singular value decomposition (SVD). In step 635, the linear preceding matrix and codeword are multiplied to produce an output vector that maps the codeword to orthogonal eigen streams, and the output vector is provided to a plurality of transmit antennas for transmission. Recall that following the STTCC encoding 600, the output vector may undergo further processing as desired including, but not limited to, interleaving, spreading, scrambling, pulse shaping and carrier modulation before being transmitted by the antennas.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in wireless communication, the method comprising:
   eigen spatial temporal turbo channel coding (E-STTCC) an input data stream by:
      generating a data vector based on the input data stream using serial-to-parallel (S/P) conversion;
      modulating the data vector to generate systematic bits;
      generating a first set of parity bits based on the data vector;
      generating a second set of parity bits based on the data vector;
      generating selected parity bits based on the first and second sets of parity bits;
      concatenating the systematic bits and the selected parity bits to generate a codeword;
      decomposing a received channel matrix to generate a linear precoding matrix;
      multiplying the linear precoding matrix and the codeword to produce an output vector whereby all of the systematic bits are mapped to a first orthogonal spatial stream and all of the parity bits are mapped to a second orthogonal spatial stream, the first orthogonal spatial stream having a higher power than the second orthogonal spatial stream; and
   transmitting the output vector using a plurality of multiple input-multiple output (MIMO) transmit antennas such that all of the systematic bits are transmitted via the first orthogonal spatial stream and all of the selected parity bits are transmitted via the second orthogonal spatial stream, wherein the first orthogonal spatial stream includes a weighted combination of a transmission from each of a first subset of MIMO transmit antennas selected from the plurality of MIMO transmit antennas and the second orthogonal spatial stream includes a weighted combination of a transmission from each of a second subset of MIMO transmit antennas selected from the plurality of MIMO transmit antennas.

2. The method of claim 1, wherein the decomposing the channel matrix includes using a singular value decomposition (SVD).

3. The method of claim 2, wherein the linear precoding matrix is an orthonormal basis for the first orthogonal spatial stream and the second orthogonal spatial stream.

4. The method of claim 1, further comprising interleaving the systematic bits and the selected parity bits prior to the multiplying the linear precoding matrix and the codeword.

5. The method of claim 1, wherein the generating a data vector includes interleaving the input data stream.

6. A wireless transmit/receive unit (WTRU) comprising:
   an eigen spatial temporal turbo channel coding (E-STTCC) encoder including:
      a serial-to-parallel (S/P) converter configured to generate a data vector from an input data stream;
      a first modulation mapping unit configured to modulate the data vector to generate systematic bits;
      a first parity bit generator configured to generate a first plurality of parity bits based on the data vector;
      a second parity bit generator configured to generate a second plurality of parity bits based on the data vector;
      a parity bit selector configured to generate selected parity bits based on the first plurality of parity bits and second plurality of parity bits;
      an eigen beamform precoder configured to:
         generate a codeword by combining the systematic bits and selected parity bits;
         decompose a received channel matrix to generate a linear precoding matrix;
         multiply the linear precoding matrix and the codeword to produce an output vector whereby all of the systematic bits are mapped to a first orthogonal spatial stream and all of the parity bits are mapped to a second orthogonal spatial stream, the first orthogonal spatial stream having a higher power than the second orthogonal spatial stream; and
   a plurality of multiple input-multiple output (MIMO) transmit antennas configured to transmit the output vector such that all of the systematic bits are transmitted via the first orthogonal spatial stream and all of the selected parity bits are transmitted via the second orthogonal spatial stream, wherein the first orthogonal spatial stream includes a weighted combination of a transmission from each of a first subset of MIMO transmit antennas selected from the plurality of MIMO transmit antennas and the second orthogonal spatial stream includes a weighted combination of a transmission from each of a second subset of MIMO transmit antennas selected from the plurality of MIMO transmit antennas.

7. The WTRU of claim 6, wherein the eigen beamform precoder is configured to decompose the channel matrix using a singular value decomposition (SVD).

8. The WTRU of claim 7, wherein the linear precoding matrix is an orthonormal basis for the first orthogonal spatial stream and the second orthogonal spatial stream.

9. The WTRU of claim 6, further comprising an interleaver configured to interleave the systematic bits and the selected parity bits and to output the interleaved bits to the eigen beamform precoder.

10. The WTRU of claim 6, further comprising an interleaver configured to interleave the input data stream and output the interleaved data stream to the S/P converter.

* * * * *